United States Patent

[11] 3,560,006

| [72] | Inventor | Tamotsu Watanabe<br>Kashiwazaki-shi, Japan |
| --- | --- | --- |
| [21] | Appl. No. | 759,367 |
| [22] | Filed | Sept. 12, 1968 |
| [45] | Patented | Feb. 2, 1971 |
| [73] | Assignee | Riken Piston Ring Kogyo Kabushiki Kaisha<br>Tokyo, Japan |
| [32] | Priority | Oct. 4, 1967 |
| [33] | | Japan |
| [31] | | 42/63512 |

[54] PISTON RINGS
7 Claims, 3 Drawing Figs.

[52] U.S. Cl. .................................................. 277/235,
277/224; 117/105, 117/105.2
[51] Int. Cl. ..................................................... F02f 5/00,
F16j 15/28, F16j 9/00
[50] Field of Search .......................................... 277/231,
235, 235A; 117/105.2

[56] References Cited
UNITED STATES PATENTS

| 2,905,512 | 9/1959 | Anderson | 277/235A |
| --- | --- | --- | --- |
| 2,997,413 | 8/1961 | Wagner | 117/105.2 |
| 3,031,331 | 4/1962 | Aves et al. | 117/105.2 |
| 3,133,739 | 5/1964 | Marien | 277/235 |
| 3,186,723 | 6/1965 | Wagner | 277/235A |
| 3,197,335 | 7/1965 | Leszynski | 117/105.2 |
| 3,404,606 | 10/1968 | Papst | 277/235 |

FOREIGN PATENTS

| 930,089 | 7/1963 | Great Britain | 277/235A |
| --- | --- | --- | --- |

*Primary Examiner*—William L. Freeh
*Assistant Examiner*—John J. Vrablik
*Attorney*—Oldham & Oldham

ABSTRACT: Piston rings having improved resistances to wear and scuffing are provided by forming a bearing coat of a mixture of molybdenum and an appropriate ceramic material, such as aluminum trioxide, zirconium dioxide or titanium oxide, on at least one of the bearing surfaces of the piston ring by flame spraying such mixture on the surface or on a recessed area thereof.

PATENTED FEB 2 1971
3,560,006
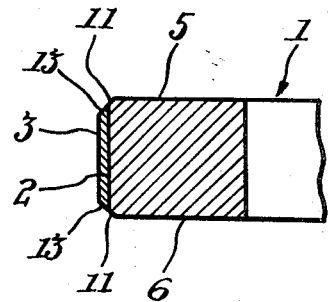
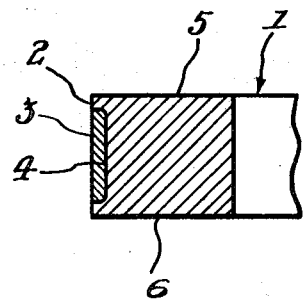
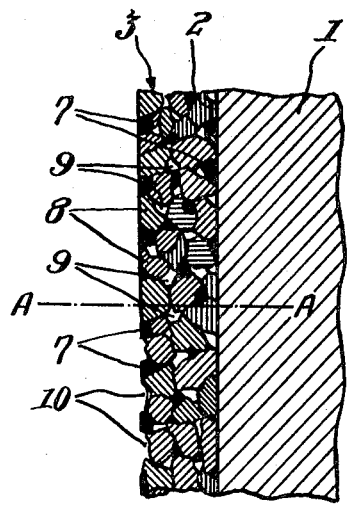
INVENTOR
Tamotsu Watanabe
BY Oldham and Oldham
ATTORNEY

PISTON RINGS

This invention relates to improvements in or relating to piston rings usable in reciprocating engines and is intended to provide piston rings particularly usable with advantage in internal combustion engines.

In recent years, particularly with internal combustion engines of smaller sizes such as those for automobiles, there has been a tendency to increase the compression ratio and the r.p.m. with a view to enhance the engine performance. To attain the purpose, piston rings must be able to work satisfactorily under the heavy duty having sufficient resistances to wear, corrosion and scuffing or galling. Thus, to sustain heavy duties, piston rings must have a satisfactory strength, resiliency and heat resistance and, as a matter of greater importance, are required to have bearing surfaces satisfactorily resistant to wear, scuffing and corrosion for sliding contact with the adjacent wall of the cylinder and the walls of the grooves formed in the associated piston to receive the piston rings.

The present invention concerns itself primarily with improvements in or relating to the structure of piston rings made of iron and more particularly to the bearing surfaces thereof.

One measure previously taken to overcome such problems as relating to wear, corrosion and scuffing or galling of the bearing surfaces included the steps of chromium plating the surfaces, and further plating them with a soft metal such as lead, tin or copper or an appropriate combination thereof; and, in some cases, flame spraying of molybdenum was employed in place of the chromium plating. However, the chromium plating involves a relatively high processing cost and is susceptible to scuffing because of the relatively low melting point (1800° C.) of chromium. Flame-sprayed molybdenum coatings, on the other hand, exhibit a better oil-retaining property owing to their porosity and a better resistance to scuffing owing to their higher melting point (2620° C.), but, as compared with the chromium coatings, are less resistant to wear because of their lower hardness and involve higher costs.

In order to overcome these deficiencies of conventional chromium-plated or molybdenum-sprayed piston rings, the present invention proposes to flame spray the surface of a piston ring with a powdery mixture including molybdenum, having a high melting point, and a ceramic material, having a high hardness, in an appropriate proportion. The term "ceramic material" as used herein is intended to mean aluminum oxide, zirconium oxide, titanium oxide or other like metal oxide and the weight proportion desirably includes approximately 30 to 50 percent ceramic and the remainder molybdenum.

The primary object of the present invention is to provide piston rings for internal combustion engines which are durable even under heavy duty of high-speed, high-pressure operation.

Another object of the invention is to provide piston rings of the kind described which exhibit desired resistance characteristics with respect to wear and scuffing for an extended life of use.

A further, specific object of the invention is provide piston rings flame sprayed with a mixture of molybdenum and ceramic material, which exhibit a high oil retentivity owing to the porosity of the flame spray coating, and cause only a limited wear to the associated cylinder and the piston rings themselves particularly at the starting or initial idling period of the engine operation.

These and other objects and advantages of the present invention will become more apparent by reference to the following description taken in conjunction with the accompanying drawing, in which:

FIG. 1 is a fragmentary cross section of a form of piston ring embodying the present invention;

FIG. 2 is a view similar to FIG. 1 illustrating another embodiment of the present invention; and FIG. 3 is a combined fragmentary cross section illustrating the microscopic structure of the surface layer of the embodiment of FIG. 1 or 2, the upper half portion above the dot-dash line A-A showing the surface structure as sprayed and the lower half the state of the surface in service.

Referring to the drawing and particularly to FIG. 1, there is shown a piston ring including a cast-iron body 1 and a coat or layer 3 of a molybdenum-ceramic mixture formed on the external peripheral surface 2 of the body by flame spraying. The opposite edges of the peripheral portion 2 of the body are beveled as at 11, and likewise the sprayed coat 3 has each of its edge portions contoured to form a bevel surface 13 which merges in the adjacent beveled portion 11 of the ring surface 2. The bevel formation not only provides convenience in the coating operation but also is effective to prevent the coat 3 from breaking off at its opposite edges in use.

In FIG. 2, which illustrates a modification of the embodiment of FIG. 1, the peripheral surface 2 of the body 1 of the piston ring is recessed to a relatively limited depth as indicated at 4 and such recess is filled with a molybdenum-ceramic mixture by flame spraying. The sprayed filling or coating 3 preferably has a thickness of the order of from 0.1 to 0.2 mm.

Similar coating may be applied also to the opposite side surfaces 5 and 6 of the ring body and such side coating can exhibit satisfactory lubricity and resistance to corrosion with a thickness of from 0.01 to 0.02 mm.

The flame-sprayed molybdenum-ceramic layer 3 formed on the piston ring has a structure as shown in the microscopic cross-sectional illustration of FIG. 3. Particles 7 of the ceramic material are dispersed or dotted in the structure and surrounded by molybdenum particles 8. Numerous fine voids 9 are also formed in the structure between the adjacent particles imparting an extremely high porosity to the structure.

The sprayed molybdenum particles 8 exhibit an extremely high bond or cohesive strength between themselves and with respect to the iron-base metal forming the ring body and at the same time firmly embrace the ceramic particles between themselves in closely adhering relation thereto, irrespective of the relatively limited bonding strength of the ceramic particles, which are obviously sprayed simultaneously with the molybdenum particles. Further, fine voids 9 are formed between the particles adhering to each other, as pointed out hereinbefore, and such voids 9 are much finer and more numerous than those obtainable in a flame-sprayed layer of molybdenum alone, thus giving the structure an extremely high porosity and hence a much better lubricant retentivity. The molybdenum-ceramic mixture forming the layer 3 should preferably include 50 to 70 percent by weight of molybdenum and the remainder of ceramic. Ceramics have only a relatively limited bonding strength as pointed out hereinbefore and, with any excessively low molybdenum content, the ceramic particles cannot be firmly embraced or secured in place in the sprayed structure and thus will be liable to be dislodged therefrom. Also, in this case the resistance of the structure to scuffing will be impaired. On the other hand, any molybdenum percentage exceeding 70 percent is to be avoided as it will give only a it limited wear resistance because of the corresponding excessively low percentage of ceramic, which is of a higher hardness than molybdenum, though such high molybdenum percentage gives a better resistance to scuffing.

The surface layer 3 formed by flame spraying a mixture of molybdenum and ceramic material exhibits an improved lubricant retentivity as it includes much finer and more numerous voids than a sprayed layer of molybdenum alone and also exhibits an excellent resistance to wear and scuffing owing to the high melting points and hardnesses of the ingredient materials. In this connection, it is to be noted that the difference in hardness between molybdenum and ceramic material, the former being less hard than the latter, favorably acts in the layer 3. Referring to the lower half of FIG. 3 lying below the line A-A, when the piston ring carrying the layer 3 works in sliding engagement with the associated cylinder wall, the ceramic particles 7 dispersed in the surface of the layer 3 can remain in place because of their higher hardness but the molybdenum particles 8 lying between the ceramic particles are worn at a higher rate to form recesses 10 which serve as an oil pool. This is an important factor which enables such piston rings to obtain an improved resistance to scuffing as well as to wear and explains the fact that the use of such piston rings gives rise to a remarkable reduction in the torque resistance met in starting the engine from its standstill state. The use of ceramic material in the spray mixture is also highly advantageous from the economic viewpoint as the ceramic material is much less expensive than molybdenum.

Table 1, which follows, shows the results of abrasion tests conducted with specimens of different spray coatings respectively containing a ceramic material alone, molybdenum alone and a molybdenum-ceramic mixture according to the present invention.

TABLE 1.—AMOUNT OF WEAR (In mm.$^3 \times 10^{-3}$)

| No. of specimen | Friction speed, mps. | | | | | | |
|---|---|---|---|---|---|---|---|
| | 0.5 | 1.0 | 1.5 | 2.0 | 2.5 | 3.0 | 3.5 |
| 1 | 1.75 | 1.60 | 15.25 | 14.75 | 15.5 | 16.0 | 16.0 |
| 2 | 2.5 | 2.75 | 3.0 | 3.5 | 4.0 | 3.75 | 3.5 |
| 3 | 1.63 | 1.62 | 1.60 | 1.25 | 1.3 | 1.62 | 1.87 |

Specimen No. 1: $Al_2O_3$ spray coating
Specimen No. 2: Mo spray coating
Specimen No. 3: $Al_2O_3$ Mo spray coating
 (according to the present invention)
Test conditions:
Rotary abrasion tests with lubricant oil at 40° C.
Load weight: 18.9 kg.
Rubbing distance: 600 m.
Mated rotor material: Cast iron for cylinder use Table 2 shows the results of scuffing tests conducted at a definite speed under successively increased loads with specimens of different spray coatings respectively including $Al_2O_3$ alone, Mo alone, and a Mo—$Al_2O_3$ mixture.

TABLE 2.—FRICTION FORCE (In kg.)

| No. of Specimen | Load, kg. | | | | | | | | | |
|---|---|---|---|---|---|---|---|---|---|---|
| | 60 | 70 | 80 | 90 | 100 | 110 | 120 | 130 | 140 | 150 |
| 1 | 1.5 | 1.8 | 2.3 | 2.65 | 3.7 | *9.7 | | | | |
| 2 | 1.8 | 2.2 | 2.6 | 3.2 | 3.9 | 4.2 | 4.8 | *9.3 | | |
| 3 | 1.4 | 2.0 | 2.5 | 3.0 | 4.2 | 4.3 | 5.3 | 6.1 | 6.8 | *10.0 |

Specimen No. 1: $Al_2O_3$ spray coating
Specimen No. 2: Mo spray coating
Specimen No. 3: $Al_2O_3$—Mo spray coating
 (according to the present invention)
Test conditions:
Rotary abrasion tests with a lubricant oil at 60° C.
Friction speed: 8 m.p.s.
Friction time: 3 min. under each load
Mated rotor material: Cast iron for cylinder use As apparent from tables 1 and 2 of the abrasion testing, the spray coating of a molybdenum-ceramic mixture according to the present invention exhibited a much improved wear resistance compared with that obtained with the spray coating of aluminum oxide ($Al_2O_3$) or molybdenum alone and suffered scuffing only at the contact pressure of 150 kilograms as contrasted with the spray coating of $Al_2O_3$ or Mo alone, which was scuffed under the contact pressure of 110 ks. or 130 ks., respectively. Thus, the spray coating according to the present invention has proved to be the most excellent in resistance to wear and to scuffing.

From the foregoing it is seen that a novel and improved piston ring has been provided and that the objects of the invention have been achieved.

While the invention has been described specifically in connection with a spray mixture of molybdenum and aluminum oxide, it is to be clearly understood that this description is made only by way of example and not as a limitation to the scope of the invention. It will be apparent to those skilled in the art that, for example, titanium or zirconium can be used in place of molybdenum while giving substantially the same successful results.

I claim:

1. A piston ring having an improved resistance to wear and scuffing with at least one of its bearing surfaces carrying thereon a flame sprayed coating of a substantially homogeneous mixture of molybdenum and ceramic material throughout the coating.

2. A piston ring is claimed in claim 1 in which the flame sprayed coating is comprises of from 50 to 70 percent, by weight, of molybdenum and the remainder of ceramic material.

3. A piston ring is claimed in claim 1 in which the ceramic material is aluminum trioxide.

4. A piston ring as claimed in claim 1 in which the ceramic material is zirconium dioxide.

5. A piston ring as claimed in claim 1 in which the ceramic material is titanium oxide.

6. A piston ring having improved resistance to wear and scuffing, and provided at least on one surface with a flame sprayed bearing coating of an extremely high porosity composed of ceramic material particles dispersed in to 50 to 70 percent by weight of molybdenum particles on the weight basis of bearing coating, said ceramic material being selected from the group consisting of aluminum trioxide, zirconium dioxide and titanium oxide.

7. A piston ring as in claim 6 comprising said ceramic material being distributed throughout the entire bearing coating.